United States Patent
McLean et al.

(10) Patent No.: US 7,678,479 B2
(45) Date of Patent: Mar. 16, 2010

(54) HYDROGEN FUEL DELIVERY SYSTEMS

(75) Inventors: Gerard Francis McLean, West Vancouver (CA); Joerg Zimmermann, Vancouver, BC (CA)

(73) Assignee: Angstrom Power Incorporated, North Vancouver (CA)

( * ) Notice: Subject to any disclaimer, the term of this patent is extended or adjusted under 35 U.S.C. 154(b) by 365 days.

(21) Appl. No.: 11/288,158

(22) Filed: Nov. 29, 2005

(65) Prior Publication Data
US 2006/0117659 A1   Jun. 8, 2006

Related U.S. Application Data

(60) Provisional application No. 60/631,164, filed on Nov. 29, 2004.

(51) Int. Cl.
- H01M 8/04 (2006.01)
- H01M 8/00 (2006.01)
- H01M 8/18 (2006.01)
- C01B 3/02 (2006.01)
- C01B 3/08 (2006.01)

(52) U.S. Cl. .............. 429/17; 429/13; 429/19; 429/22; 429/25; 423/648.1; 423/657

(58) Field of Classification Search ............... 429/12, 429/13, 17, 19, 22, 25; 48/61; 423/648.1, 423/657
See application file for complete search history.

(56) References Cited

U.S. PATENT DOCUMENTS

| | | | |
|---|---|---|---|
| 3,174,833 A * | 3/1965 | Blackmer | .................. 422/108 |
| 3,346,718 A * | 10/1967 | Cooley et al. | ............... 392/401 |
| 3,542,062 A * | 11/1970 | Jacobellis et al. | ........ 137/512.3 |
| 6,634,321 B2 | 10/2003 | Hussain et al. | |
| 6,651,307 B2 | 11/2003 | Portmann | |
| 6,676,163 B2 | 1/2004 | Joitescu et al. | |
| 6,726,892 B1 | 4/2004 | Au | |
| 6,755,225 B1 | 6/2004 | Niedwiecki et al. | |
| 7,037,483 B2 * | 5/2006 | Suzuki et al. | ............. 423/648.1 |
| 2004/0146754 A1 * | 7/2004 | Arthur et al. | ................... 429/12 |
| 2008/0077802 A1 | 3/2008 | Richardson et al. | |

FOREIGN PATENT DOCUMENTS

| | | | |
|---|---|---|---|
| CA | 2406603 A1 | 11/2001 | |
| CA | 2373553 A1 | 8/2003 | |
| EP | 0995944 | * | 4/2000 |

OTHER PUBLICATIONS

Conte, M. et al., Overview of energy/hydrogen storage: state-of-the-art of the technologies and prospects for nanomaterials, Materials Science & Engineering B, vol. 108, Issue 1-2, Apr. 2004, pp. 2-8.

* cited by examiner

*Primary Examiner*—Patrick Ryan
*Assistant Examiner*—Thomas H. Parsons
(74) *Attorney, Agent, or Firm*—Schwegman Lundberg & Woessner, P.A.

(57) ABSTRACT

A method for providing hydrogen to a hydrogen-powered device comprises providing a buffer connected to supply hydrogen to the device. The buffer is filled with hydrogen by coupling the buffer to a cartridge containing a predetermined quantity of hydrogen. The hydrogen in the cartridge may be stored in a form having a higher energy density than the hydrogen in the buffer. Systems comprising hydrogen-powered devices that include such buffers are also described.

25 Claims, 2 Drawing Sheets

HYDROGEN FUEL DELIVERY SYSTEMS

CROSS-REFERENCE TO RELATED APPLICATION

This application claims the benefit of U.S. patent application Ser. No. 60/631,164 filed on 29 Nov. 2004 and entitled "Hydrogen Fuel Delivery Systems" which is hereby incorporated by reference herein.

TECHNICAL FIELD

This invention relates to the field of hydrogen energy. Embodiments of the invention provide systems and methods for delivering and storing hydrogen fuel. The invention may be applied to supplying hydrogen to any hydrogen energy system, but is particularly suited for use in conjunction with fuel cells or hydrogen powered internal combustion engines. While the invention is particularly suited to portable and transportation applications, it can also be used in stationary, extra-terrestrial or sub-sea applications.

BACKGROUND

Hydrogen may be used as a fuel for fuel cells, internal combustion engines and other hydrogen-consuming systems. All hydrogen powered devices require a mechanism for supplying hydrogen. Hydrogen may be supplied from a suitable on-board hydrogen store. A device which has a local hydrogen supply coupled with a suitable mechanism for delivering hydrogen from the supply to the hydrogen consuming part of the device may be made to be mobile. Examples include fuel cell or internal combustion powered vehicles, or fuel cell powered portable electronic devices.

The prevailing paradigm for designing hydrogen powered systems is to implement a scheme of periodically refilling the on-board storage in a manner analogous to the way gasoline is used to refuel conventional internal combustion engines. In portable devices the refueling can be done by refilling an on-board tank, or by using a removable, replaceable, tank so that refueling the device becomes analogous to replacing primary batteries in a conventional battery-powered portable electronic device. In either case, fuel is delivered to the device, stored on-board, and then delivered into the fuel cell or other hydrogen-consuming part of the device.

Figure 1A:
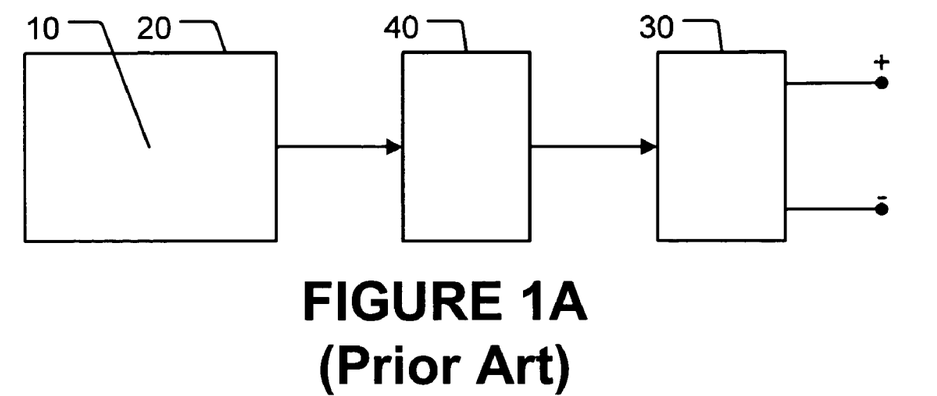
FIGS. 1A and 1B are block diagrams of two prior art hydrogen-fueled systems.

A conceptual schematic block diagram of these prior art configurations is shown in FIG. 1A. Fuel 10 is placed into a fuel tank 20 that is connected to an energy converter 30 (e.g. a fuel cell) through a delivery mechanism 40.

Figure 1B:
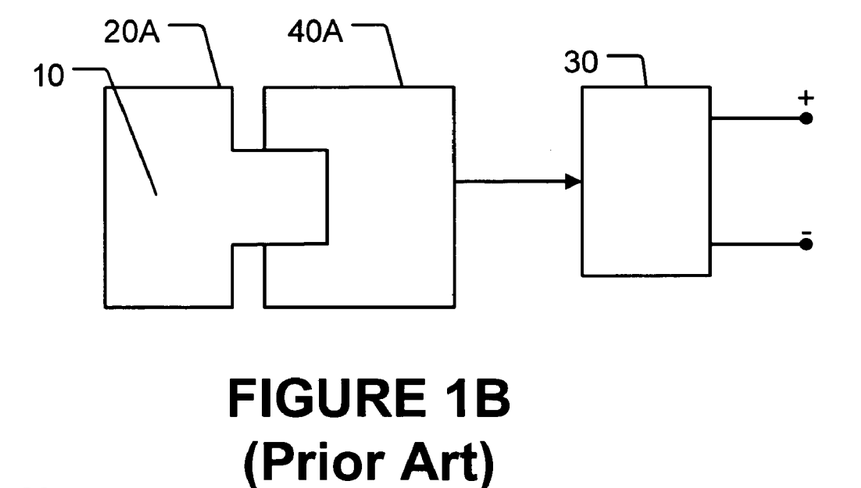

In FIG. 1B a fuel 10 is provided in a removable fuel cartridge 20A that is connected to energy converter 30 through delivery mechanism 40A.

The low volumetric energy density of hydrogen gas presents problems in designing practical hydrogen-powered devices. While hydrogen has the highest energy density of any known substance by weight, its volumetric energy density is quite low. In order to make hydrogen-powered devices feasible some means of storing hydrogen that improves its volumetric energy density must be provided.

For hydrogen power to compete effectively with conventional gasoline or battery power the volumetric energy density of the stored hydrogen must be increased. Typical targets for volumetric energy density are described in M. Conte et al. Overview of energy/hydrogen storage: state-of-the-art of the technologies and prospects for nanomaterials, Materials Science and Engineering B, vol. 108, Issue 1-2, April 2004, pp. 2-8, which is hereby incorporated herein by reference. The US Department of Energy goal for hydrogen storage is to achieve >63 kg/m$^3$ hydrogen by volume, and >5% hydrogen by weight.

In prior art systems, fuel tanks or fuel cartridges and fuel delivery mechanisms must be designed to interface between the characteristics of the fuel and the requirements of the device being supplied by fuel. For example, hydrogen fuel cells require a supply of hydrogen in which the purity, temperature, humidity, pressure and flow rate of the hydrogen are typically required to be controlled. Any means for connecting a fuel supply (tank or cartridge) to a fuel cell system must ensure the characteristics of the hydrogen entering the fuel cell are compatible with these requirements. A central problem in the design of fuel cell systems is that the characteristics of the fuel required by the fuel cell are typically very different from the characteristics of high energy density hydrogen storage. Fuel delivery mechanisms 40, 40A must be carefully designed to receive hydrogen under the conditions of the hydrogen tank or cartridge and to supply hydrogen in a state required by a fuel cell. This is a central function in most fuel cell systems, leading to significant complexity in design and manufacture.

Compressing hydrogen to very high pressures increases the density of the stored gas. Small compressed gas cylinders can safely store hydrogen at up to 700 bar in composite structures that achieve energy densities approaching 6% by weight. Even these are still quite large on a volumetric basis. Few, if any, fuel cells can withstand such high pressures. The interface between such a high-pressure storage canister and a fuel cell must provide valving, step-down pressure regulators and flow controllers suitable to provide the hydrogen to the fuel cell at a pressure and flow rate appropriate to the fuel cell. Regulators, in particular, are a problem since typical fuel cell systems operate at pressures less than 4 bar. Achieving a step-down pressure regulation of 150 times or more can be difficult.

The following are some example high pressure hydrogen storage systems:

U.S. Pat. No. 6,651,307 "Process for manufacturing a prestressed fiber-reinforced high pressure vessel";

U.S. Pat. No. 6,676,163 "Replaceable fuel system module and method";

U.S. Pat. No. 6,634,321 "Systems and method for storing hydrogen"; and,

U.S. Pat. No. 6,755,225 "Transportable hydrogen refueling station".

Liquified hydrogen can be stored in highly insulated dewars. Liquefied hydrogen has energy densities approaching the requirements for transportation applications. There are difficulties in managing the boil off of hydrogen that occurs if the liquid is left unused for prolonged periods. Further, when hydrogen is needed to operate the fuel cell, a conversion from liquid to gaseous hydrogen must be effected almost instantaneously. Therefore the delivery mechanism must at once super-insulate but then rapidly boil the liquid hydrogen in an efficient controlled and regulated fashion.

Figure 2:
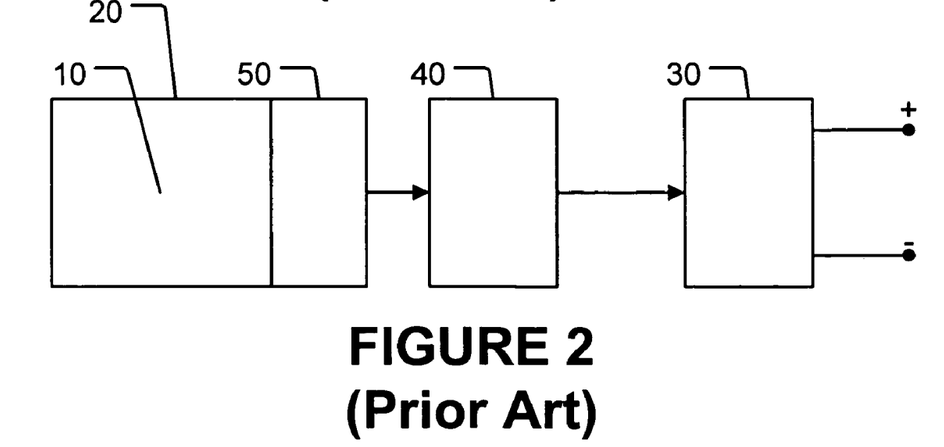
FIG. 2 is a conceptual block diagram of a hydrogen-powered system according to one embodiment of the invention incorporating a hydrogen-generator; and, FIG. 3 is a conceptual block diagram of a hydrogen-powered system according to another embodiment of the invention.

Various hydrogen-generating chemical compounds, known as chemical hydrides, can be used as a 'fuel' from which hydrogen can be generated locally. Systems which use such fuels must include a 'hydrogen generator' component before the hydrogen delivery mechanism. A system having a hydrogen generator 50 is shown in FIG. 2. A central challenge in designing a practical hydrogen generator is to provide a practical mechanism for controlling the rate of conversion of the chemical hydride to hydrogen and by-products to roughly match the rate at which hydrogen is demanded by the system.

Examples of rate-controlling hydrogen generators include:
CA 2,373,553, "Ca, Mg, and Ni Containing Alloys and Method for Preparing & Use Thereof for Gas Phase H2 Storage"; and,
CA 2,406,603, "Method of $H_2$ Generation for Fuel Cell Applications and $H_2$ Generation System".

There are a large number of hydrogen-containing chemical compounds which have hydrogen storage characteristics that are extremely attractive for mobile hydrogen energy systems. Some such compounds are listed in Table I. Controlling the rate at which hydrogen is produced from these compounds is very difficult. This lack of control makes such reactions unsuitable for directly supplying hydrogen to a fuel cell or other hydrogen-consuming device.

TABLE I

Some Hydrogen-Producing Reactions

| Reactants | Products | Weight % $H_2$ | Volumetric $H_2$ Density (ml reactant/liter of $H_2$ released @ STP) | Comments |
| --- | --- | --- | --- | --- |
| $2Al + 6H_2O$ | $3H_2 + 2Al(OH)_3$ | ~3.5 | 1.81 | Needs caustic water solution |
| $NaH + H_2O$ | $H_2 + NaOH$ | 4.8 | 1.56 | |
| $CaH_2 + 2H_2O$ | $2H_2 + Ca(OH)_2$ | 5.2 | 1.35 | |
| $MgH_2 + 2H_2O$ | $2H_2 + Mg(OH)_2$ | 6.5 | 1.2 | |
| $Mg(AlH_4)_2 + 8H_2O$ | $8H_2 + Mg(Al(OH)_4)_2$ | 7.0 | N/A | $Mg(AlH_4)_2$ not readily available |
| $AlH_3 + 3H_2O$ | $3H_2 + Al(OH)_3$ | 7.2 | N/A | |
| $LiAlH_4 + 4H_2O$ | $4H_2 + LiAl(OH)_4$ | 7.3 | 1.27 | |
| $NaBH_4 + 4H_2O$ | $4H_2 + NaB(OH)_2$ | 7.3 | 1.2 | Requires catalyst |
| $LiH + H_2O$ | $H_2 + LiOH$ | 7.7 | 1.16 | |
| $LiBH_4 + 4H_2O$ | $4H_2 + LiB(OH)_2$ | 8.6 | 1.16 | |
| $N_2H_4$ | $2H_2 + N_2$ | 12.5 | 0.71 | Requires catalyst |
| $0.85Mg(BH_4)_2$ * $2NH_3 + 0.075Li\ NO_3 + 0.075PTFE$ | 99.8% pure $H_2$ | 12.84 | N/A | Requires source of ignition |
| $NH_4F + LiBH_4$ | $4H_2 + BN + LiF$ | 13.6 | 0.78 | Requires source of ignition |
| $N_2H_4 + 2NH_3$ | $5H_2 + 2N_2$ | 15.1 | 0.74 | Requires pressure vessel and catalyst |
| $0.5NH_3BH_3 + 0.3N_2H_4 * 2BH_3 + 0.098(NH_4)_2B_{10}H_{10} + 0.102NH_4NO_3$ | 94% pure $H_2$ | 16.52 | N/A | Requires source of ignition |
| 700 Bar $H_2$ | $H_2$ | 100 | 1.43 | Requires high pressure vessel |

Prior art approaches to fueling hydrogen powered devices typically share the characteristics of bringing high energy density hydrogen carriers (hydrogen fuels) on-board the device and of implementing a specialized mechanism to convert the stored hydrogen fuel to hydrogen. As a result, such hydrogen powered systems are limited in the range of 'fuels' that can be employed. Only fuels for which a rate controlling delivery mechanism can be designed are feasible, and each hydrogen-powered system must be tuned to operate from one and only one type of hydrogen fuel. These two characteristics present an impediment to the design and deployment of practical hydrogen-powered systems.

There remains a need for practical methods and apparatus for supplying hydrogen to hydrogen-fueled devices.

BRIEF DESCRIPTION OF THE DRAWINGS

In drawings illustrating non-limiting embodiments of the invention.

DESCRIPTION

Throughout the following description, specific details are set forth in order to provide a more thorough understanding of the invention. However, the invention may be practiced without these particulars. In other instances, well known elements have not been shown or described in detail to avoid unnecessarily obscuring the invention. Accordingly, the specification and drawings are to be regarded in an illustrative, rather than a restrictive, sense.

One aspect of the invention provides hydrogen delivery mechanisms which include a buffer for the intermediate storage of hydrogen within a hydrogen powered system. Another aspect of the invention provides methods for fueling such hydrogen-powered systems. The methods involve introducing controlled amounts of hydrogen into the buffer. The amounts of hydrogen are set to ensure that the conditions of the hydrogen in the buffer are suitable for delivery to a fuel-consuming device in the system.

The buffer can be filled with hydrogen delivered from a high density storage in a batch fashion. This eliminates the need for regulating the rate of production from the high density fuel. The buffer stores hydrogen locally in a form that is more conducive to the characteristics required by the fuel cell, engine, or other fuel consuming device. A relatively simple mechanism may be used to supply hydrogen from the buffer to the hydrogen-consuming device.

Hydrogen may be introduced into a hydrogen buffer from any of a wide range of high density hydrogen storage means. Multiple different means may be used at different times to refill the same buffer with hydrogen.

Figure 3:
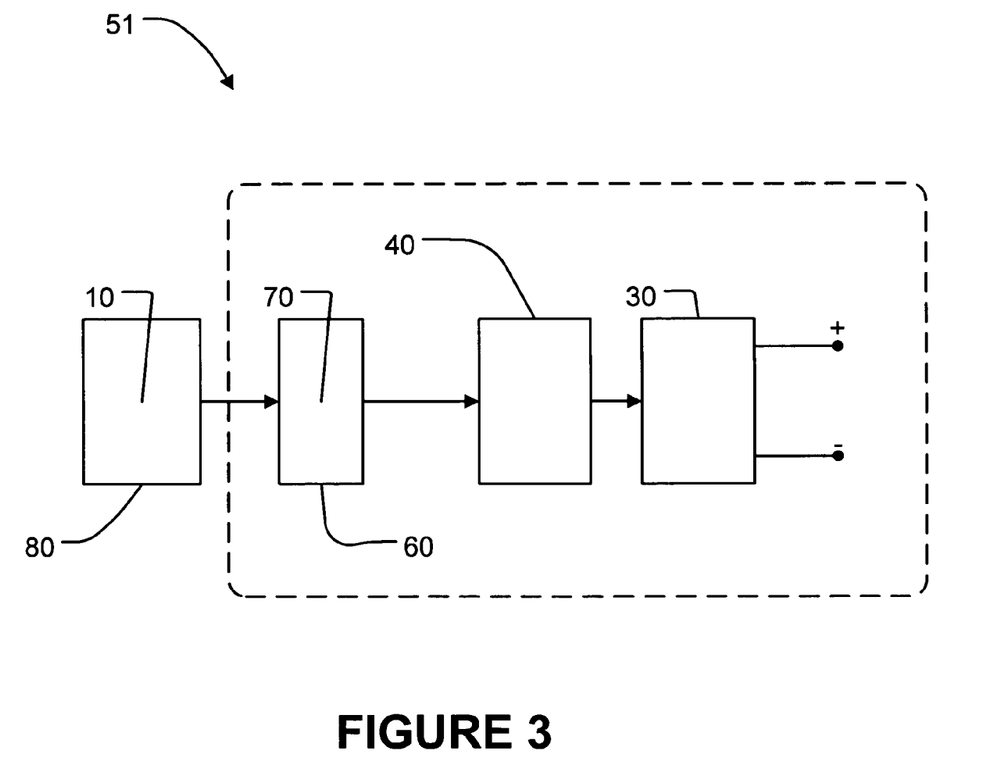

FIG. 3 is a conceptual block diagram of a hydrogen-powered system 51 according to the invention. System 51 includes a hydrogen buffer 60. Hydrogen buffer 60 comprises a sealed compartment. The compartment may be empty or may contain a material that helps to hold hydrogen. For example, the material may hold hydrogen by chemisorption or physisorption. Some examples of materials that can hold and subsequently release hydrogen are metal hydrides, carbon nanotubes and zeolites. Buffer 60 reversibly receives hydrogen from a hydrogen source and subsequently releases the hydrogen to a fuel cell, engine or other hydrogen-consuming device. Buffer 60 preferably has a pressure-relief valve to prevent over-pressure conditions from occurring.

The conditions within buffer 60 are more closely similar to the conditions under which hydrogen should be delivered to a fuel cell or other hydrogen-consuming device than are the conditions in a cartridge 80 in which hydrogen is supplied. Cartridge 80 typically stores hydrogen in a high-density form. The state of hydrogen within cartridge 80 may not be suitable for direct use of the hydrogen in a fuel cell or other hydrogen-consuming device. Thus, providing buffer 60 as in the embodiment of FIG. 3, permits hydrogen delivery mechanism 40 to be relatively simple. A variety of different fuels and containers can be employed to recharge buffer 60 after most of the hydrogen in buffer 60 has been used up.

Some Buffer Constructions

The size and construction of the hydrogen buffer affects the duration of operation of the hydrogen energy system between periodic recharging from fuel containers. The design of the characteristics of particular systems is up to the discretion of the designer subject to the limitations of the fuel and cartridge.

The construction of the buffer can also be chosen to suit the needs of the particular application, trading off size, weight and cost at the discretion of the system designer. For instance, the buffer may be sized such that multiple fuel cartridges are required to completely fill the buffer. This allows 'hot refueling' that does not interrupt the operation of the device, and allowing continuous operation that is longer than could be provided from any single recharge. Alternatively but less desirably, the hydrogen buffer could be sized smaller than the fuel container's delivery capacity in which case some hydrogen would be wasted when the buffer is refilled. The size of the buffer can be chosen to best suit the needs of the particular application.

The buffer can have a hydrogen capacity sufficient to provide a desired runtime, and to provide short-term storage of hydrogen in a form that is most suitable for the end use. This means the actual operating system is optimized for use, instead of being compromised for dealing with peculiarities of a hydrogen storage means.

The hydrogen buffer can be formed as a low pressure compressed hydrogen vessel. In this case the volume of the buffer can be the limiting factor in design. Weight, cost, speed of recharge and simplicity of interfacing the buffer to the hydrogen power generator would all be near optimal.

Buffer 60 may be filled by rapidly introducing a pre-determined charge of hydrogen from a cartridge 80 which may comprise any suitable high-density hydrogen source. Cartridge 80 may comprise a container capable of holding hydrogen or a hydrogen precursor material. In some of the disclosed embodiments the container need not be perfectly gas-tight. In some embodiments the container is only required to contain hydrogen gas for a time sufficient to allow hydrogen gas to be delivered into buffer 60. The following are examples of structures for hydrogen cartridge 80:

- a volume smaller than the buffer containing compressed hydrogen gas;
- a reaction vessel in which reactants can be caused to undergo a hydrogen-liberating reaction and to thereby liberate a predetermined amount of hydrogen;
- a vessel containing a predetermined amount of liquefied hydrogen; or
- a predetermined amount of hydrogen stored in a hydrogen-absorbing material.

A prototype embodiment of the invention uses a 500 ml PET plastic container as a buffer to hold hydrogen fuel for a fuel cell system. Such a container can be virtually instantly charged to approximately 6 bar from any of a variety of hydrogen generating or delivering sources which can be constructed to deliver into the buffer an amount of hydrogen which would occupy 2.5 liters at standard temperature and pressure. Since the generation of the hydrogen is controlled by mass, no complex regulators or flow control are employed when charging the buffer. Once charged to 6 bar, the container provides gaseous hydrogen to a fuel cell with a simple valve and a flow rate restrictor, which may comprise a length of narrow-gauge tubing or an orifice, as the interface between the buffer and the fuel cell. The interface optionally includes a pressure regulator.

An alternative buffer construction provides a chamber containing a reversible hydrogen absorbing material, such as a suitable metal hydride, as the buffer. In this case the ratio of the volume of the buffer to the compressed gas buffer can be reduced at the expense of increased overall cost, much slower recharging time and significantly increased weight. The manner of charging the hydride buffer, and the manner of delivery of hydrogen from the buffer to the fuel cell are roughly equivalent to the compressed gas buffer system described above.

As soon as buffer 60 has been charged with hydrogen 70 the expended cartridge 80 may be disconnected from buffer 60. Subsequently, hydrogen 70 from buffer 60 is delivered to the hydrogen energy system.

In some embodiments, buffer 60 comprises an enlarged hydrogen-supply plenum in a fuel cell. In a handheld device, the volume within an enclosure of the device could be sealed and used as a buffer. Runtime and performance will depend upon the hydrogen capacity of the buffer and the power consumption of the device.

Cartridge 80 is preferably made to be tamper resistant, to have a long shelf life, and to be inexpensive to produce.

EXAMPLE 1

Fuel Supplied from High Pressure Container

In one example embodiment of the invention, cartridge 80 comprises a cannister containing compressed hydrogen gas. The cannister may, for example, be similar to the canisters holding pressurized $CO_2$ gas that are used in powering air rifles or inflating tires. Cartridge 80 may be coupled to buffer 60 by way of a coupling mechanism which provides a seal and then punctures cartridge 80 at a relatively weak spot.

When the interior of cartridge 80 is placed in fluid communication with buffer 60, hydrogen flows from cartridge 80 into buffer 60 until the pressures in cartridge 80 and buffer 60 are equalized. Since buffer 60 is significantly larger than cartridge 80, after the pressure has equalized most of the hydrogen is in buffer 60 and the pressure within buffer 60 is moderate. At this point, cartridge 80 may be removed. A suitable valve is provided to prevent hydrogen from flowing out of buffer 60 by way of the connection to cartridge 80 after cartridge 80 has been removed. The valve may comprise a one-way valve and/or a valve opened by the connection of cartridge 80 to the device incorporating buffer 60 and closed by the removal of cartridge 80.

The amount of hydrogen stored in some suitable form 10 in a cartridge 80 is fixed and controlled by the mass of hydrogen that would be produced, or by the design of cartridge 80. For instance, if cartridge 80 is a compressed gas cylinder, then the internal volume of the cartridge is selected to store a pre-determined mass of hydrogen at the operating pressure of cartridge 80. Similarly if the hydrogen is supplied in cartridge 80 in the form of a chemical hydride then cartridge 80 may be charged with a pre-determined mass of the hydride material which will release a desired mass of hydrogen. In all cases the cartridge/fuel combination produces a predetermined and known mass of hydrogen which is selected not to exceed the mass storage capability of hydrogen buffer 60. This eliminates the need to have a mechanism for controlling the rate of flow of hydrogen between cartridge 80 and the fuel-consuming device.

The amount of hydrogen which will be introduced into buffer 60 from cartridge 80 can be accurately predicted by applying standard physics gas calculations.

In some embodiments of the invention, the amount of hydrogen introduced into buffer 60 is such that the pressure within buffer 60 immediately after buffer 60 is recharged from an empty condition does not exceed 40 bar and preferably does not exceed 10 bar. In some embodiments, the pressure within buffer 60 immediately after buffer 60 is recharged is about 6 bar.

As an example, consider a cartridge 80 which is a small high pressure vessel containing an amount of hydrogen equivalent to 2.5 liters of hydrogen (at STP). The hydrogen within the pressure vessel is compressed to a very high pressure, for example, 700 bar. This pressure vessel could not be connected to a typical fuel cell without the use of a step down pressure regulator to control the flow rate of hydrogen from the high pressure storage into the fuel cell. By using a hydrogen buffer we can connect cartridge 80 to the buffer and essentially instantly discharge the high pressure hydrogen into the buffer. The ratio of the volume of cartridge 80 to the combined volume of cartridge 80 and buffer 60 is chosen so that, as the hydrogen expands, its pressure will reduce to a suitable value such as 6 bar as it expands to fill the combined volume of the small high pressure vessel and the buffer. The interface between cartridge 80 and buffer 60 could be as simple as puncturing the high pressure vessel in such a way as to allow the stored hydrogen to rapidly reach an equilibrium pressure of 6 bars between the buffer and the vessel. There are obvious design issues that must be addressed to make a safe interface.

A pressure relief valve may be provided to prevent buffer 60 from being over filled. In the alternative, the coupling between buffer 60 and cartridge 80 may be designed to shut off the flow of hydrogen into buffer 60 before buffer 60 is overfilled.

EXAMPLE 2

Hydrogen Supplied from Hydrogen Generator

Cartridge 80 may comprise a hydrogen generator. Any suitable reaction may be used to generate hydrogen gas. For example, hydrogen may be produced by any of:

hydrolysis (reacting a suitable precursor with water to yield hydrogen);

alcoholysis (reacting a suitable precursor with an alcohol to yield hydrogen); or thermolysis (heating a suitable precursor to yield hydrogen).

The amount of reactants are controlled to limit the amount of hydrogen produced. Suitable hydrogen precursor material(s) may be introduced into, stored or delivered in cartridge 80. The reactants may be housed in separate compartments which prevent the reactants from mixing while cartridge 80 is in storage. When it is desired to recharge a buffer 60, cartridge 80 may be connected to the buffer 60 and then the reactants can be mixed, for example by opening a valve, breaking a vial containing one of the reactants, or the like. Cartridge 80 may contain a catalyst or other substances or means for causing the complete conversion of the hydrogen precursor material(s) to hydrogen and byproducts.

Cartridge 80 can be coupled to buffer 60 and the hydrogen precursor material(s) can be caused to react to produce a predetermined amount of hydrogen. Because cartridge 80 is significantly smaller than buffer 60, most of the hydrogen flows into buffer 60. It is not necessary to limit the rate at which hydrogen is produced. The hydrogen-producing reaction can be allowed to proceed to completion in a time that is much shorter than the time taken to consume the resulting hydrogen. Hydrogen is produced in batches. The total mass of hydrogen produced in each batch can be quite easily controlled by controlling the overall mass of hydrogen precursor material(s) provided in cartridge 80. The rate of hydrogen production becomes relatively unimportant so long as the total mass of hydrogen produced can be safely contained within hydrogen buffer 60.

This system replaces rate control of hydrogen production with mass control of hydrogen production. The system is particularly attractive for using hydrogen-containing chemical compounds, since we can now employ chemical substances for which there is no practical means of controlling the rate of the reaction.

Cartridge 80 does not need to be complex or expensive. A rolled paper container, for instance, could be sufficient to contain dry hydrogen precursor(s). A glass vial of liquid/catalyst blend could be embedded within the container. When the hydrogen precursors are mixed by breaking the glass vial, the spontaneous creation of hydrogen would generate pressure and other reactants but only for a short period of time since the hydrogen will move to buffer 60. A rolled paper container could withstand these pressures for a short time. The rolled paper could then substantially absorb any liquid byproducts of the reaction and be disposed of.

Building a cartridge that can handle high pressures is costly. Using the buffer approach, cartridge 80 can be simply a storage for a suitable chemical hydride rather than a pressure vessel. Production of such disposable fuel cartridges can be economical, since it is possible to make the cartridges such that they do not also have to be pressure vessels.

Further, since it is not necessary, within reason, to limit the rate at which hydrogen is produced in cartridge 80, cartridge 80 may be designed so that hydrogen will be generated regardless of the orientation of cartridge 80. In contrast, some mechanisms for controlling the rate of hydrogen production must have a certain side facing up to function properly or at all.

The hydrogen precursors used in a hydrogen generator may be quite benign and have long shelf lives. Solid hydrogen precursor materials may be kept in a dry state within cartridge 80 until it is desired to use cartridge 80. This is advantageous since some reactants are corrosive and/or have undesirably short shelf lives when they are mixed with a liquid to form a slurry or solution.

There are a great many alternative examples of reactions that yield hydrogen as a product that could be used to generate hydrogen for use according to this invention. For example, a known mass of dry sodium borohydride may be mixed with a measured quantity of water in cartridge 80 to produce a required amount of hydrogen. There is no inherent pressure regulation in this reaction. As the hydrogen evolves it will flow into buffer 60 and charge buffer 60 continually until the hydrogen production reaction stops. By controlling the mass of dry sodium borohydride, the total amount of hydrogen generated can be easily controlled. Cartridge 80 may be disconnected immediately after the hydrogen production reaction stops.

For example, suppose that the desired amount of hydrogen gas is 2.5 liters at STP. If one assumes that the predominant reaction is $$NaBH_4 + 4H_2O \rightarrow 4H_2 + NaB(OH)_4$$

then 1.04 grams of $NaBH_4$ and 1.98 grams of water are needed to produce 2.5 l of hydrogen gas. In order to ensure that the reaction goes to completion, a greater quantity of water than is required stoichiometrically, for this case approximately 3 ml or more of water, should be used.

If cartridge 80 is designed to hold the pre-measured amounts of sodium borohydride and water in separate chambers, then a relatively safe means of high energy density hydrogen storage is created. Mixing the contents of the two chambers causes hydrogen to evolve according to the above reaction. No rate controlling mechanism is required, since the total amount of hydrogen produced is determined by pre-measuring the mass of the dry sodium borohydride.

Another example of a chemical that may be used as a precursor to generate hydrogen is a highly reactive compound such as lithium hydride or hydrazine. Once again, the amount of hydrogen that will be produced can be controlled by controlling the mass of the hydrogen precursors. It is unnecessary to provide a production rate controlling mechanism. Rather, we simply need to ensure the rate of uncontrolled hydrogen generation (i.e. complete conversion of the stored hydrogen to gaseous hydrogen) is sufficiently safe.

In another example, cartridge 80 contains a material that gives off hydrogen gas when heated. Heat to cause the release of hydrogen gas may be provided in any suitable manner. For example:

cartridge 80 may include chemicals that can be mixed to cause an exothermic reaction;

cartridge 80 may be heated when it is connected to fill buffer 60 by heat from the device in which buffer 60 is located. The heat may be waste heat from a fuel cell or other heat-generating component or heat provided by an electric or other heater disposed to heat the material in cartridge 80. In some embodiments, cartridge 80 includes a resistive heating element that can be heated by passing electrical current through it to heat the hydrogen-releasing material. The electrical power may be supplied by a battery associated with cartridge 80 or from an electricity supply in the device that includes buffer 60 or an external electricity supply.

In some embodiments, a single cartridge 80 contains multiple separate volumes of hydrogen-releasing material that can be caused to release hydrogen individually. Each of the volumes releases a pre-determined mass of hydrogen when it is heated, mixed with another reactant or otherwise initiated. Each volume of hydrogen-releasing material may be initiated when buffer 60 is getting low on hydrogen. As an example of such an embodiment, a cartridge 80 may include a plurality of heaters than can each be operated to heat a volume of hydrogen-releasing material. The heaters may be operated one at a time as more hydrogen is required.

EXAMPLE 3

Hydrogen Supplied from Liquified Hydrogen Source

"A liquid hydrogen refueling system suitably configured to store and/or transfer a cryogenic liquid could also be employed. In this case a highly-insulated sealed vial containing a known mass of liquid hydrogen (for example, 2.5 liters at standard temperature and pressure) is connected to the buffer 60. once the vial is opened, the hydrogen in the vial will quickly boil to gas. The majority of the hydrogen will flow into buffer 60 before the pressure in the buffer 60 and vial equalize at a pressure of, for example, 6 bar."

EXAMPLE 4

Hydrogen Supplied from Metal Hydride, Carbon Nanotube, or Other Hydrogen-Retaining Material Cartridge 80 may contain a metal hydride, carbon nanotubes, or other material capable of combining with hydrogen in a manner such that the energy density of the hydrogen is increased within cartridge 80.

EXAMPLE 5

Hydrogen Supplied from Charging Station

Some embodiments of the invention provide charging stations in which pre-measured quantities of hydrogen are delivered to effectively instantly charge the buffer in a mobile or portable system. In such embodiments, the charging station acts as a cartridge 80. The charging station may deliver the hydrogen at high pressure or in the form of liquid hydrogen for example.

Interchangeability of Fuel Sources

A buffer 60 can be recharged with hydrogen from any source which provides a suitable mass of hydrogen. For example, all of the above types of hydrogen cartridge 80 could be used to refill a buffer 60 as long as the cartridge 80 and buffer 60 have compatible couplings. One benefit that can be realized is fueling independence. Chemical, compressed, liquefied and adsorbed hydrogen storage can all exist in a complementary way.

Different cartridges from different manufacturers that may use very different internal means for storing and/or generating hydrogen may all be used to replenish the same buffer 60. So long as there is a common connection means, and the mass of hydrogen produced is standardized, then a single fuel cell system design could work interchangeably with cartridges of many designs, potentially from many manufacturers. Thus, one could provide a brand of 'safe hydrogen' which, perhaps at the cost of reduced overall performance, may be made to have low-toxicity for use in children's toys, as well as a brand of 'high performance' hydrogen intended for military, police or industrial use. High performance cartridges may contain more toxic or volatile compounds but with overall higher energy densities. Moreover, cartridges using 'safe' hydrogen generating compounds may be approved for airline travel to address the issue of enabling personal mobility with fuel cell devices.

In portable applications, the separation of the fuel tank/delivery system into a high energy density cartridge/buffer/delivery system can provide an overall improved system energy density. The system will support a 'hot refueling' method, so the buffer can be recharged while the device is in operation. Therefore a system of multiple 'charge cartridges' replenishing the buffer can provide an overall efficient solution to the problem of fueling portable devices. Cartridges need to be connected to the portable devices only for brief periods to refill the buffer. The cartridge can be disconnected immediately after hydrogen in the cartridge has flowed into the buffer and an equilibrium has been established. In typical embodiments the cartridge needs to be connected for less than a few seconds.

As will be apparent to those skilled in the art in the light of the foregoing disclosure, many alterations and modifications are possible in the practice of this invention without departing from the spirit or scope thereof. This invention has many aspects that may be exploited individually or in combination with one another or in combination with other technologies.

While a number of exemplary aspects and embodiments have been discussed above, those of skill in the art will recognize certain modifications, permutations, additions and sub-combinations thereof. It is therefore intended that the following appended claims and claims hereafter introduced are interpreted to include all such modifications, permutations, additions and sub-combinations as are within their true spirit and scope.

What is claimed is:

1. A method for supplying hydrogen to fuel a hydrogen-consuming device, the method comprising:
   providing a buffer coupled to supply hydrogen to the device;
   providing a cartridge containing a predetermined quantity of one or more hydrogen precursors operable to generate hydrogen;
   placing the cartridge in fluid communication with the buffer and initiating the generation of hydrogen from the one or more hydrogen precursors;
   allowing the hydrogen generated from the predetermined quantity of the one or more hydrogen precursors to flow from the cartridge into the buffer; and,
   allowing the cartridge to be fluidly decoupled from the buffer solely by removal of the cartridge from the hydrogen-consuming device after a maximum useable amount of the predetermined quantity of hydrogen generated from the predetermined quantity of the one or more hydrogen precursors is transferred from the cartridge to the hydrogen-consuming device.

2. A method according to claim 1 wherein allowing the hydrogen to flow into the buffer comprises allowing a pressure differential between the cartridge and the buffer to drive the hydrogen into the buffer through a valve.

3. A method according to claim 1 wherein the buffer has a volume larger than a volume of the cartridge, the predetermined quantity of hydrogen is initially within the cartridge at a first pressure and a pressure of the hydrogen within the buffer is significantly lower than the first pressure when the cartridge is allowed to be fluidly decoupled upon disconnection from the buffer.

4. A method according to claim 3 wherein the first pressure is in excess of 400 bar.

5. A method according to claim 1 comprising, prior to allowing the cartridge to be fluidly decoupled from the buffer, allowing a pressure of hydrogen gas in the buffer to equalize with a pressure of hydrogen gas in the cartridge.

6. A method according to claim 1 wherein initiating the generation of hydrogen within the cartridge comprises mixing two or more hydrogen precursor materials.

7. A method according to claim 6 comprising providing a catalyst within the cartridge, the catalyst facilitating reaction of the two or more hydrogen precursor materials to yield hydrogen gas.

8. A method according to claim 6 wherein the two or more hydrogen precursor materials comprise at least one liquid material.

9. A method according to claim 8 wherein the liquid material comprises water.

10. A method according to claim 8 wherein the liquid material is provided in a stoichiometric excess.

11. A method according to claim 1 wherein initiating the generation of hydrogen within the cartridge comprises heating a quantity of the hydrogen precursor material in the cartridge to yield hydrogen by thermolysis.

12. A method according to claim 1 wherein allowing the cartridge to be fluidly decoupled from the buffer solely by removal of the cartridge comprises allowing the cartridge to be fluidly decoupled when a pressure of hydrogen within the buffer is less than or equal to approximately 10 bar.

13. A method according to claim 12 comprising allowing hydrogen to flow from the buffer to the fuel-consuming device by way of a pathway that does not include a pressure regulator.

14. A method according to claim 1 wherein allowing the cartridge to be fluidly decoupled solely by removal comprises allowing the cartridge to be fluidly decoupled upon disconnection when a pressure of hydrogen within the buffer is less than or equal to approximately 40 bar when the cartridge is disconnected from the buffer.

15. A method according to claim 1 wherein, after allowing the hydrogen to flow into the buffer, an amount of the hydrogen in the buffer is limited by the predetermined quantity of the one or more hydrogen precursors.

16. A method according to claim 1 wherein, after allowing the hydrogen to flow into the buffer, a ratio of a mass of hydrogen remaining in the cartridge to a mass of hydrogen in the buffer does not exceed a ratio of a volume of the cartridge to a volume of the buffer.

17. A system comprising:
   a hydrogen-consuming device;
   a buffer coupled to supply hydrogen from within the buffer to the hydrogen-consuming device;
   an externally engageable coupling for removably placing the buffer in fluid communication with a cartridge containing one or more hydrogen precursors operable to generate a predetermined mass of hydrogen; and,
   wherein the cartridge is coupleable to the buffer by way of the coupling that is configured to initiate fluid communication between the cartridge and the buffer solely upon engagement, wherein the engagement also initiates the generation of hydrogen gas from the one or more hydrogen precursors, the cartridge being further configured to discontinue the fluid communication solely upon disengagement, wherein the predetermined mass of hydrogen is sufficient to fill the buffer with a desired amount of hydrogen.

18. A system according to claim 17 wherein an energy density of hydrogen in the cartridge prior to allowing the hydrogen to fill the buffer is significantly different from an energy density of hydrogen in the buffer after allowing the hydrogen to fill the buffer.

19. A system according to claim 17 wherein the hydrogen-consuming device comprises a fuel cell.

20. A system for fueling hydrogen-powered devices comprising a means for storing and transporting hydrogen fuel in a first form providing a high energy density; a means for transforming the hydrogen fuel from the first form into a second form having properties permitting convenient use as a direct fuel; and a means for removably and externally coupling to the hydrogen-powered device, and when removably coupled, the fueling of the hydrogen-powered device is initiated solely upon coupling to the hydrogen powered device.

21. A system according to claim 20 wherein the means for transforming the hydrogen comprises a means for transferring the hydrogen into a buffer on-board a portable device.

22. A system according to claim 21 wherein buffer comprises a low-pressure compressed gas compartment.

23. A system according to claim 21 wherein the buffer comprises a hydrogen-absorbing material.

24. A system according to claim 20 wherein the means for storing and transporting hydrogen fuel comprises a cartridge containing at least one of: a chemical hydride, a high pressure compressed gas, liquid hydrogen, a multi-component chemical mixture capable of creating hydrogen, a hydrogen-absorbing material charged with hydrogen, and combinations thereof.

25. A system according to claim 20 wherein the means for storing and transporting hydrogen fuel comprises a means for containing and keeping at least two chemical hydrogen precursor materials separate and a means for combining the at least two chemical hydrogen precursor materials to generate hydrogen.

* * * * *

UNITED STATES PATENT AND TRADEMARK OFFICE
CERTIFICATE OF CORRECTION

| | |
|---|---|
| PATENT NO. | : 7,678,479 B2 |
| APPLICATION NO. | : 11/288158 |
| DATED | : March 16, 2010 |
| INVENTOR(S) | : Gerard F. McLean et al. |

Page 1 of 1

It is certified that error appears in the above-identified patent and that said Letters Patent is hereby corrected as shown below:

In column 10, line 17, delete "once" and insert -- Once --, therefor.

In column 10, line 25, delete "Other" and insert -- other --, therefor.

Signed and Sealed this

First Day of June, 2010

David J. Kappos
*Director of the United States Patent and Trademark Office*